United States Patent
Tai et al.

(10) Patent No.: US 8,718,597 B2
(45) Date of Patent: May 6, 2014

(54) MOBILE PHONE SEARCH DEVICE AND SEARCH METHOD THEREOF

(75) Inventors: Chiao-Yen Tai, Taipei (TW); Chang Wen Yao, Taipei (TW)

(73) Assignees: Mobitek Communication Corp., Taipei (TW); MediaTekSingapore Pte. Ltd., Solaris (SG)

( * ) Notice: Subject to any disclaimer, the term of this patent is extended or adjusted under 35 U.S.C. 154(b) by 0 days.

(21) Appl. No.: 13/524,661

(22) Filed: Jun. 15, 2012

(65) Prior Publication Data

US 2013/0237180 A1    Sep. 12, 2013

(30) Foreign Application Priority Data

Mar. 9, 2012  (TW) .............................. 101108198 A (51) Int. Cl.
   *H04M 11/04*    (2006.01)
(52) U.S. Cl.
   USPC .................. 455/404.2; 455/404.1; 455/414.1; 455/414.2; 455/456.5; 455/418
(58) Field of Classification Search
   USPC ........... 455/521, 519, 404.1, 404.2, 517, 507, 455/457, 456.6, 456.5, 456.3, 456.1, 418
   See application file for complete search history.

(56) References Cited

U.S. PATENT DOCUMENTS

| | | | | |
|---|---|---|---|---|
| 5,369,783 | A * | 11/1994 | Childress et al. | 455/17 |
| 7,091,852 | B2 * | 8/2006 | Mason et al. | 340/539.13 |
| 7,245,214 | B2 * | 7/2007 | Smith | 340/539.13 |
| 2007/0281705 | A1 * | 12/2007 | Bosenbecker | 455/445 |
| 2009/0047923 | A1 * | 2/2009 | Jain et al. | 455/404.1 |
| 2009/0143081 | A1 * | 6/2009 | Onishi et al. | 455/456.6 |
| 2009/0186596 | A1 * | 7/2009 | Kaltsukis | 455/404.2 |
| 2010/0240315 | A1 * | 9/2010 | Tufvesson et al. | 455/67.11 |
| 2011/0117923 | A1 * | 5/2011 | Yonezawa et al. | 455/456.1 |
| 2011/0238751 | A1 * | 9/2011 | Belimpasakis et al. | 709/204 |
| 2012/0064855 | A1 * | 3/2012 | Mendelson | 455/404.2 |
| 2013/0166198 | A1 * | 6/2013 | Funk et al. | 701/446 |
| 2013/0218959 | A1 * | 8/2013 | Sa et al. | 709/204 |

* cited by examiner

*Primary Examiner* — Khai M Nguyen
(74) *Attorney, Agent, or Firm* — Muncy, Geissler, Olds & Lowe, P.C.

(57) ABSTRACT

A mobile phone search device and search method thereof. Firstly, utilize a portable mobile phone detector to transmit a base station signal in its transmission region, and this region covers at least one or more mobile phones. Then, when the mobile phone detects the base station signal, it can log onto a network to establish communication channel with the portable mobile phone detector, and that can assign a communication number to each of the mobile phones, for the mobile phones to communicate in voice signal or short message with the portable mobile phone detector on its own initiative. Through applications of the mobile phone search device and search method thereof, the mobile phone having its communication with the base station disrupted can be detected and communication re-established swiftly, thus locating said trapped person and raising rescue efficiency significantly.

30 Claims, 3 Drawing Sheets

MOBILE PHONE SEARCH DEVICE AND SEARCH METHOD THEREOF

BACKGROUND OF THE INVENTION

1. Field of the Invention

The present invention relates to a search technology, and in particular to a mobile phone search device and search method thereof.

2. The Prior Arts

Nowadays, in the highly developed metropolitan area, high rise buildings, such as office buildings, shopping centers, theaters, gymnasiums are densely located. Once an accident or a disaster occurs, such as fire hazard, earthquake, or even terrorist attacks in these densely populated area, the rampage of frightened crowd may incur heavy causalities. However, when this kind of disaster occurs, quite a lot of people may be buried in the debris, and they are difficult to locate. Unless the trapped person has specific means to send out SOS signals, or the communication equipment capable of sending out distress signals, otherwise, the rescue operation can not be carried out effectively.

For this reason, rescuers are provided with life detectors (such as infrared sensing device, probe, or sonar), to be inserted into the debris of the trapped person, to obtain his conditions and any signs of life, or even communicate with the trapped person in case he is conscious, to enable the rescuers to determine the proper rescue strategy. In such situations, sonar life detector can determine accurately the position of the trapped person, and the conditions of his injury through that person's response. However, since the search area of the life detector is rather limited, and in the debris, it requires gap in between and it takes time to get close to the trapped person. In addition, it is not capable of providing statistical information automatically about the searched targets and progress of the search operation. Moreover, it can not be connected to the International Rescue Organization to get timely assistance, so its disaster rescuing efficiency is rather limited.

Therefore, presently, the design and performance of mobile phone search device and search method are not quite satisfactory, and it has much room for improvement.

SUMMARY OF THE INVENTION

In view of the problems and drawbacks of the prior art, the present invention provides a mobile phone search device and search method thereof, so as to solve the shortcomings of the prior art.

A major objective of the present invention is to provide a mobile phone search device and search method thereof, that utilizes the portability characteristics of a mobile phone, such that when an accident or a disaster occurs, and communications between base station and mobile phone is disrupted, a portable mobile phone detector can be used to establish fast communication with the mobile phone, to determine target position, record the rescue operations, and provide the communication as required. In case the mobile phone of the trapped person is provided with a built-in backward transmission program, it can also use the mobile phone to send back specific data or perform certain actions to assist the rescue operations. The data thus obtained is sent back to the Central Main Machine (server) as the timely information to the Rescue Operation Center, or to a predetermined position to provide timely information required. Moreover, it can be connected through a network to a web-site of International Rescue Organization to get timely assistance.

In order to achieve the above-mentioned objective, the present invention provide a mobile phone search device, including a portable mobile phone detector, that is able to transmit a base station signal in its transmission region, and when at least one or more mobile phones in the transmission region detect the base station signal, it can log onto a network to establish communication channel with the portable mobile phone detector, and that can assign a communication number to each of the mobile phones, for the mobile phones to communicate with the portable mobile phone detector on its own initiative. In addition, in case the mobile phone is provided with a built-in backward transmission program, it can send back the telephone related data and personal data to the detector, for the detector to determine position of the mobile phone, record the conditions discovered and actions taken, and to proceed with the rescue operations in cooperation with the rescue web-site.

The present invention also provides a mobile phone search method, implemented through a portable mobile phone detector, comprising the following steps. Firstly, a portable mobile phone detector transmits a base station signal in its transmission region. Then, when at least one or more mobile phones in the transmission region detect the base station signal, it can log onto the network to establish communication channel with the portable mobile phone detector, and that can assign a communication number to each of the mobile phones, for the mobile phones to communicate with the portable mobile phone detector on its own initiative. In addition, in case the mobile phone is provided with a built-in backward transmission program, it can send back the telephone related data and personal data to the detector, for the detector to determine position of the mobile phone, record the conditions discovered and actions taken, and to proceed with the rescue operation through cooperation with the rescue web-site.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The related drawings in connection with the detailed description of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed description with reference to the attached drawings. And, in the following, various embodiments are described in explaining the technical characteristics of the present invention.

Figure 1:
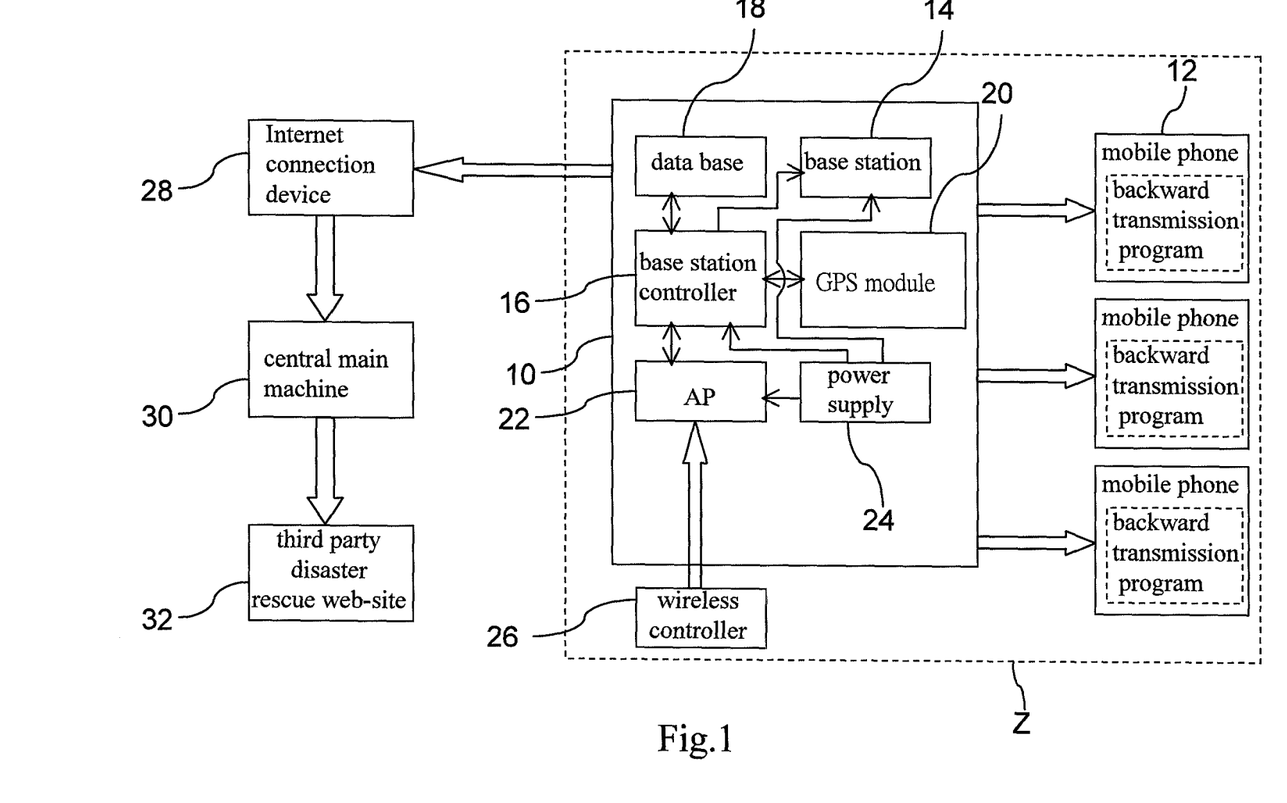
FIG. 1 is a block diagram of a mobile phone search device according to the present invention.

Refer to FIG. 1 for a block diagram of a mobile phone search device according to the present invention, and that includes a portable mobile phone detector 10. When a disaster causes disruption of communications for the base station, the portable mobile phone detector 10 is able to take over the role of a base station in assisting rescue operation, such that it can transmit a base station signal in a region Z. Upon receiving such a base station signal, at least one or more mobile phones 12 in this region Z can log onto a network and establish communication channels with the portable mobile phone detector 10, such that that can assign different first communication numbers based on the communication protocols of the wireless communication network at that time, to each of the mobile phones 12, for it to use the first communication number to communicate with the portable mobile phone detector 10 on its own initiative. In a preferred embodiment, the plurality of mobile phones 12 are able to communicate with each other, if each of the mobile phones 12 can obtain the first communication numbers of other mobile phones 12.

The portable mobile phone detector 10 further includes: a base station 14, a base station controller 16, a data base 18, a Global Positioning System (GPS) module 20, an Access Point (AP) 22, and a power supply 24. Wherein, the base station 14 is connected to the base station controller 16, such that it controls the transmission of base station signals of the base station 14. Upon detecting the base station signals, the mobile phone 12 can log onto a network to establish communication channel with the base station 14. The base station controller 16 assign first communication numbers through the base station 14 to each of the mobile phones 12, for it to use the number to communicate with the base station controller 16 on its own initiative. A display screen can be disposed each on the portable mobile phone detector 10 or on the base station controller 16, for it to display image/text or marking, to assist in the rescue operation. For example, the base station controller 16 can display on its display screen markings and/or a map representing each of the mobile phones 12. And on the map is shown positions of each of the mobile phones 12, to clearly inform rescuer of the instant message or related positions for the trapped person, to facilitate swift and accurate rescue operations. Furthermore, the base station controller 16 can automatically transmit a short message to each of the mobile phones 12 via the base station 14. The short message can contain a second communication number of the base station controller 16, so that the base station controller 16 and the mobile phones 12 can communicate with each other through base station 14 by means of short message. In a preferred embodiment, the first communication number is assigned to the mobile phone 12 of the trapped person, while the second communication number is assigned to the rescuers.

The base station controller 16 is further connected to the data base 18, the Global Positioning System (GPS) Module 20, the Wireless Fidelity (WiFi) Access Point (AP) 22, and the power supply 24. Global Positioning System (GPS) Module 20 performs positioning for itself, to find the first position coordinate, then the base station controller 16 stores it in the data base 18, and it calculates the second position coordinate for the mobile phone 12 based on the signal intensity and the first position coordinate of each mobile phone 12, and also stores in the data base 18. In addition, the base station controller 16 stores in the data base 18 details of the conditions discovered and actions taken for each of the mobile phones 12, and also connects the two items corresponding to the second position coordinate. The WiFi access point 22 provides a wireless interface, so that the base station controller is controlled by a wireless controller 26, such as an intelligent handset through the WiFi access point 22. The wireless controller 26 and the base station controller 16 both utilize a second communication number, so that the wireless controller 26 utilizes the first communication number and the second communication number to communicate with each of the mobile phones 12 by means of voice signal or short message via the base station controller 16. Moreover, the wireless controller 26 can use a browser to open the display screen of the base station controller 16, to display the markings representing each of the mobile phones 12. The power supply 24 is connected to a base station 14 and the WiFi access point 22, to provide power required to the base station controller 16, and the devices connected thereto, such as the base station 14, the data base 18, the Global Positioning System (GPS) Module 20, the WiFi Access Point (AP) 22.

In another preferred embodiment, the mobile phone 12 is provided with a built-in backward transmission program. The backward transmission program is a built-in software in the mobile phone 12. For example, when the base station controller 16 transmits self-defined short message to the mobile phone 12, the backward transmission program of the mobile phone 12 is able to take corresponding actions based on the short message, such as fetching personal/telephone data or making a handset screen blinking and ringing. In addition, when a mobile phone 12 is provided with built-in backward transmission program corresponding to the base station controller 16 of the portable mobile phone detector 10, then the base station controller 16 can utilize the backward transmission program to transmit the telephone related data and the personal data of the mobile phone 12 back to the detector 10, and store in the data base 18. Or, alternatively, the base station controller 16 can utilize the backward transmission program to make the mobile phone 12 ring, or control the screen of the mobile phone 12 to blink. Wherein, the telephone related data includes but is not limited to: power data, GPS related data, blue-tooth data, battery data, camera data, General Packet Radio Service (GPRS) data, motion sensor data, FM broadcast data, loudspeaker data, and WiFi related data; while the personal data includes but not limited to name, blood type, and telephone number. On the contrary, in case the mobile phone 12 is not provided with a built-in backward transmission program mentioned above, then the base station controller 16 is not able to perform the actions mentioned above.

The portable mobile phone detector 10 is connected to a central main machine 30 through an Internet connection device 28, such that the detector 10 transmits the following information to the central main machine 30 via the Internet connection device 28: signal intensity, the first position coordinate, the detection time of the mobile phone 12, the International Mobile Subscriber Identity (IMSI), International Mobile Equipment Identity (IMEI), name of the portable mobile phone detector 10, conditions discovered and actions taken, so that the central main machine 30 can utilize the following items to provide map type display or search person service: the first position coordinate, the detection time of the mobile phone 12, the International Mobile Subscriber Identity (IMSI), the International Mobile Equipment Identity (IMEI), the name of the portable mobile phone detector 10. For example, the central main machine 30 provides a map type display to show: the number of the mobile phone 12, the detection time of the mobile phone 12, International Mobile Subscriber Identity (IMSI), International Mobile Equipment Identity (IMEI), and the name of the portable mobile phone detector 10.

In case the mobile phone is provided with a backward transmission program, the portable mobile phone detector 10 is able to transmit the telephone related data and personal data to the central main machine 30, for the applications required. Furthermore, the central main machine 30 can be connected to a third party rescue web-site 32, and transmits to it the information required for assisting the rescue operation, for it to provide the disaster rescue service. The information includes: the first position coordinate, the detection time of the mobile phone 12, the International Mobile Subscriber Identity (IMSI), International Mobile Equipment Identity (IMEI), name of the portable mobile phone detector 10, conditions discovered and actions taken.

Figure 2:
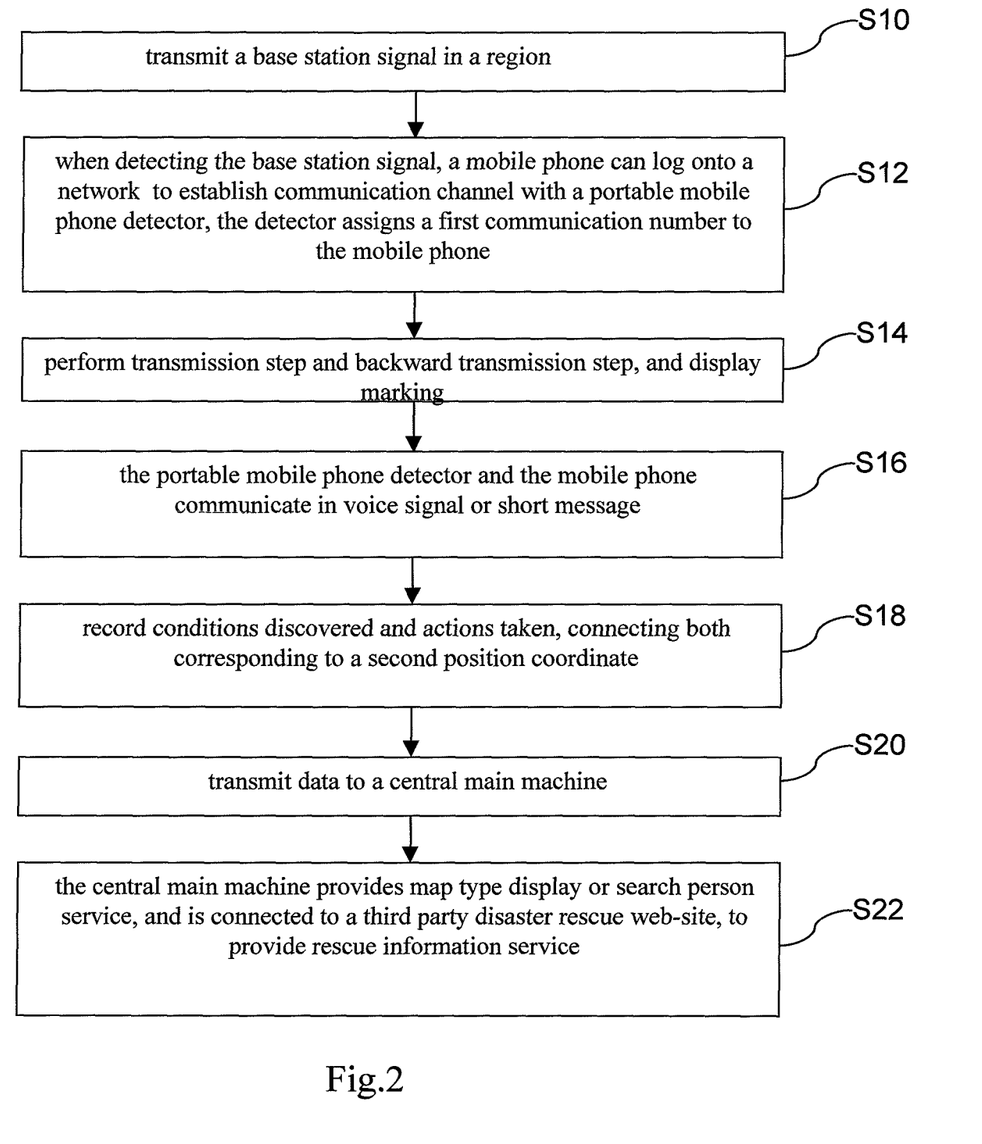
FIG. 2 is a flow chart of the steps of a mobile phone search method according to the present invention.

In the following, refer to FIG. 2 for a flow chart of the steps of a mobile phone search method according to the present invention, that can be applied to the disaster rescue in describing the operation of the present invention.

Nowadays, most of the people carry mobile phones with them to carry on daily activities, so that when a disaster occurs the communications between the commercial base station and mobile phone is disrupted. For this reason, the present invention is designed to use in this situation for rescue operations. As shown in FIG. 2, firstly, as shown in step S10, a rescuer enters into a region Z carrying a portable mobile phone detector 10, then he operates a wireless controller 26 to control the base station controller 16 to transmit a base station signal through a base station 14. Next, as shown in step S12, in the beginning, the mobile phone 12 of a trapped person in the same region Z is disconnected from the commercial base station at that time. When the mobile phone 12 detects the base station signal, it can log onto a network to establish communication channels with the base station controller 16 of the portable mobile phone detector 10. The base station controller 16 assigns different first communication numbers to each of the mobile phones 12, so that a mobile phone 12 can use this first communication number to proceed with voice or message communications with the base station controller 16 and wireless controller 26 on its own initiative.

Then, as shown in step S14, perform a signal transmission step, and in case the mobile phone 12 is provided with a backward transmission program corresponding to the portable mobile phone detector 10, then a backward transmission step can be performed simultaneously. Of course, in case a built-in backward transmission program is not provided, then the backward transmission step can be omitted.

In the signal transmission step, in a preferred embodiment, the base station controller 16 automatically transmits a short message to each of the mobile phones 12 via a base station 14, Global Positioning System (GPS) module 20 positions its own position to find a first position coordinate, and the base station controller 16 store the first position coordinate into the data base 18. The base station controller 16 further calculates a second position coordinate of the mobile phone 12 based on the signal intensity and the first position coordinate of each mobile phone 12, and stores it in the data base 18, so that the position of the trapped person can be located quickly.

In the backward transmission step, the base station controller 16 utilizes the backward transmission program to send back the telephone related data and the personal date of the mobile phone 12 to the portable mobile phone detector 10, and stores it in the data base 18. Also, the mobile phone 12 is made to ring or to blink its screen through using the backward transmission program, so that the trapped person can be found easily.

Figure 3:
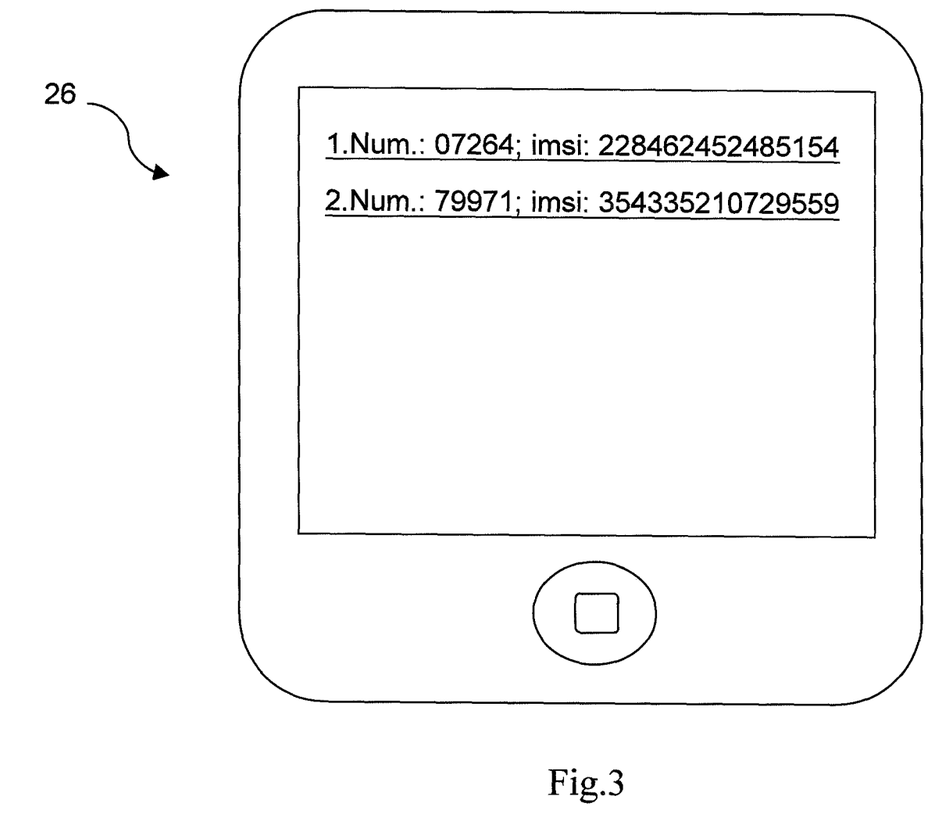
FIG. 3 is a schematic diagram of a wireless controller displaying numbers of mobile phones according to the present invention.

In addition, since the base station controller 16 is provided with a display screen, and it is controlled by the wireless controller 26 through a WiFi access point 22, therefore, in step S14, the base station controller 16 is able to display on its own display screen markings representing the respective mobile phones 12 and a map, and on this map is indicated position of each mobile phone 12. Each mobile phone 12 is marked with the first communication number or IMSI, and these markings can also be shown on the screen of the wireless controller 26 at the same time, as shown in FIG. 3. As such, the rescue team can know from the base station controller 16 or the wireless controller 26 how many trapped persons can be located.

Subsequently, as shown in step S16, the wireless controller 26 and mobile phone 12 utilize the first communication number and the second communication number to communicate with each other through voice signal or short message. For example, the trapped person can use his own mobile phone 12 to dial the second communication number of the wireless controller 26 to communicate with the rescuer through voice signal or short message, to obtain the precise rescue information. Then, as shown in step S18, the rescuer can manipulate the base station controller 16, to record in the data base 18 the conditions discovered and actions taken for each of the mobile phones 12, and connect the base station controller 16 and the mobile phone 12 to the corresponding second position coordinate.

Then, as shown in step S20, the rescuer can manipulate the base station controller 16, to transmit the following information to the central main machine 30, to assist the rescue operation: signal intensity, first position coordinate, the detection time of the mobile phone 12, the International Mobile Subscriber Identity (IMSI), International Mobile Equipment Identity (IMEI), name of the portable mobile phone detector 10, telephone data, personal data, conditions discovered and actions taken, and any data related to the rescue operation.

Finally, as shown in step S22, the central main machine 30 utilizes the following information to provide map type display or search person service: first position coordinate, the detection time of the mobile phone 12, the International Mobile Subscriber Identity (IMSI), International Mobile Equipment Identity (IMEI), name of the portable mobile phone detector 10, telephone data, personal data, conditions discovered and actions taken, and any data related to the rescue operation. For example, the central main machine 30 displays the following information on a map to provide a map type display: number of mobile phone 12, the detection time of the mobile phone 12, the International Mobile Subscriber Identity (IMSI), International Mobile Equipment Identity (IMEI), name of the portable mobile phone detector 10. Moreover, the central main machine 30 can be connected to a third party disaster rescue web-site 32, such as Ushahidi or Sahana Disaster Information Coordination System, and transmits the following information to the third party disaster rescue web-site 32, to provide disaster rescue data service, and to strengthen the rescue force: first position coordinate, the detection time of the mobile phone 12, International Mobile Subscriber Identity (IMSI), International Mobile Equipment Identity (IMEI), name of the portable mobile phone detector 10, telephone data, personal data, conditions discovered and actions taken, and any data related to the rescue operation.

In the flowchart mentioned above, steps S16 to S22 can be omitted, or only steps S20 and S22 can be omitted, the present invention can still achieve the same objective of getting in touch with the mobile phone 12. When the search device of the present invention is not provided with the Internet connection device 28, the central main machine 30, and the third party disaster rescue web-site 32, then steps S20 and S22 can be omitted.

Summing up the above, through the applications of the portable mobile phone detector, mobile phone having communication disrupted can be detected and communication re-established swiftly, thus raising disaster rescue efficiency significantly.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A mobile phone search device, comprising:
a portable mobile phone detector, located in a region to transmit a base station signal, when at least a mobile phone in said region detects said base station signal, it logs onto a network, to establish communication channel with said portable mobile phone detector, then said portable mobile phone detector assigns a first communication number to said mobile phone, to enable said mobile phone to use said first communication number to communicate with said portable mobile phone detector.

2. The mobile phone search device as claimed in claim 1, wherein
said portable mobile phone detector further comprising:
a base station;
a base station controller, connected electrically to said base station, and controls said base station in transmitting said base station signal, when said at least a mobile phone detects said base station signal, said at least a mobile phone logs onto said network to establish communication channel with said base station, and said base station controller assigns different said first communication number to each of said mobile phones via said base station, to enable said at least a mobile phone to use assigned said first communication number to communicate with said base station controller on its own initiative; and
a power supply, connected electrically to said base station controller and said base station, to supply power to said base station, said base station controller, and elements connected thereto.

3. The mobile phone search device as claimed in claim 2, wherein said base station controller transmits a short message via said base station to each of said mobile phones, said short message includes a second communication number of said base station controller.

4. The mobile phone search device as claimed in claim 3, wherein said base station controller and said mobile phone communicate with each other via said base station through using said first communication number and said second communication number in a message transmission manner.

5. The mobile phone search device as claimed in claim 2, wherein said portable mobile phone detector further comprising:
a data base, connected to said base station controller; and
a Global Positioning System (GPS) module, connected to said base station controller, to position its own position, and to find a first position coordinate, so that said base station controller stores said first position coordinate into said data base, to calculate a second position coordinate of said mobile phone based on signal intensity and said first position coordinate of each said mobile phone, and then stores in said data base.

6. The mobile phone search device as claimed in claim 5, wherein said base station controller records conditions discovered and actions taken of each said mobile phone in said data base, and connect them to correspond to said second position coordinate.

7. The mobile phone search device as claimed in claim 2, wherein said base station controller further includes a display screen, on which is shown marking representing each of said mobile phones.

8. The mobile phone search device as claimed in claim 2, wherein said base station controller further includes a display screen, on which is shown a map indicating position for each of said mobile phones.

9. The mobile phone search device as claimed in claim 6, further comprising:
an Internet connection device and a central main machine, wherein, said central main machine is connected to said portable mobile phone detector via said Internet connection device, said portable mobile phone detector transmits information to said central main machine through said Internet connection device; wherein said information comprises said signal intensity, said first position coordinate, detection time of said mobile phone, International Mobile Subscriber Identity (IMSI), International Mobile Equipment Identity (IMEI), name of said portable mobile phone detector, said conditions discovered and said actions taken.

10. The mobile phone search device as claimed in claim 9, wherein said central main machine utilizes said first position coordinate, said detection time of said mobile phone, said International Mobile Subscriber Identity (IMSI), said International Mobile Equipment Identity (IMEI), and said name of said portable mobile phone detector to provide map type display or search person service.

11. The mobile phone search device as claimed in claim 10, wherein said central main machine displays number of said mobile phone, said detection time of said mobile phone, said International Mobile Subscriber Identity (IMSI), said International Mobile Equipment Identity (IMEI), said name of said portable mobile phone detector, and said first position coordinate on a map to provide said map type display.

12. The mobile phone search device as claimed in claim 9, wherein said central main machine is further connected to a third party disaster rescue web-site, and provide said first position coordinate, said detection time of said mobile phone, said International Mobile Subscriber Identity (IMSI), said International Mobile Equipment Identity (IMEI), said name of said portable mobile phone detector, said conditions discovered and said actions taken to said third party disaster rescue web-site to provide disaster rescue information service.

13. The mobile phone search device as claimed in claim 2, wherein said portable mobile phone detector further includes a Wireless Fidelity (WiFi) access point (AP), connected to said base station controller and said power supply, so that said base station controller is controlled by a wireless controller through said WiFi access point.

14. The mobile phone search device as claimed in claim 1, wherein said mobile phone is provided with a built-in backward transmission program corresponding to said portable mobile phone detector, such that said portable mobile phone detector utilizes said backward transmission program to transmit back telephone related data and personal data of said mobile phone to said portable mobile phone detector.

15. The mobile phone search device as claimed in claim 14, wherein said telephone related data includes:
power data, GPS related data, blue-tooth data, battery data, camera data, General Packet Radio Service (GPRS)

data, motion sensor data, FM broadcast data, loudspeaker data, and WiFi related data.

16. The mobile phone search device as claimed in claim 14 wherein said personal data includes: name, blood type, and telephone number.

17. The mobile phone search device as claimed in claim 14, wherein said portable mobile phone detector further utilizes said backward transmission program to ring said mobile phone or control screen of said mobile phone to blink.

18. A mobile phone search method, implemented through a portable mobile phone detector, comprising following steps:
said portable mobile phone detector transmits a base station signal in a region; and
when at least a mobile phone in said region detects said base station signal and logs onto a network, said portable mobile phone detector and said mobile phone establish communication channel, then said portable mobile phone detector assigns a first communication number to said mobile phone, to enable said mobile phone to use said first communication number to communicate with said portable mobile phone detector.

19. The mobile phone search method as claimed in claim 18, further comprising a transmission step of said portable mobile phone detector transmitting automatically a short message to said at least a mobile phone, said short message includes a second communication number of said base station controller.

20. The mobile phone search method as claimed in claim 19, wherein in said transmission step, said portable mobile phone detector transmits automatically a short message to said at least a mobile phone, said portable mobile phone detector positions its own position, to find a first position coordinate and store it in a data base, and calculates a second position coordinate of said mobile phone based on signal intensity and said first position coordinate of said at least a mobile phone, and store it in said data base.

21. The mobile phone search method as claimed in claim 20, wherein after said transmission step, perform following steps:
said portable mobile phone detector and said mobile phone utilize said first communication number and said second communication number to communicate to each other in a message transmission manner; and
utilize said portable mobile phone detector to record conditions discovered and actions taken for said at least a mobile phone, and connect them to correspond to said second position coordinate.

22. The mobile phone search method as claimed in claim 18, wherein said portable mobile phone detector displays on its own screen markings representing each of said mobile phones.

23. The mobile phone search method as claimed in claim 18, wherein said portable mobile phone detector displays on its own display screen a map, showing position of each of said mobile phones.

24. The mobile phone search method as claimed in claim 21, wherein
after step of utilizing said portable mobile phone detector to record said conditions discovered and said actions taken, and connect them to correspond to said second position coordinate, further comprising following steps:
said portable mobile phone detector transmits said signal intensity, said first position coordinate, said detection time of said mobile phone, International Mobile Subscriber Identity (IMSI), International Mobile Equipment Identity (IMEI), name of said portable mobile phone detector, and said conditions discovered and said actions taken to a central main machine; and
said central main machine utilizes said first position coordinate, said detection time of said mobile phone, said International Mobile Subscriber Identity (IMSI), said International Mobile Equipment Identity (IMEI), said name of said portable mobile phone detector to provide map type display or search person service.

25. The mobile phone search method as claimed in claim 24, wherein in said step of said central main machine utilizing said first position coordinate, said detection time of said mobile phone, said International Mobile Subscriber Identity (IMSI), said International Mobile Equipment Identity (IMEI), said name of said portable mobile phone detector to provide said map type display, said central main machine shows on a map, number of said mobile phone, said detection time of said mobile phone, said International Mobile Subscriber Identity (IMSI), said International Mobile Equipment Identity (IMEI), said name of said portable mobile phone detector, and said first position coordinate.

26. The mobile phone search method as claimed in claim 21, wherein in said step of said central main machine utilizing said first position coordinate, said detection time of said mobile phone, said International Mobile Subscriber Identity (IMSI), said International Mobile Equipment Identity (IMEI), said name of said portable mobile phone detector to provide said map type display or said search person service, said central main machine utilizes said first position coordinate, said detection time of said mobile phone, said International Mobile Subscriber Identity (IMSI), said International Mobile Equipment Identity (IMEI), and said name of said portable mobile phone detector to provide said map type display or said search person service, and said central main machine is further connected to a third party disaster rescue web-site, and transmits said first position coordinate, said detection time of said mobile phone, said International Mobile Subscriber Identity (IMSI), said International Mobile Equipment Identity (IMEI), said name of said portable mobile phone detector, said conditions discovered and said actions taken to said third party disaster rescue web-site, to provide disaster rescue data service.

27. The mobile phone search method as claimed in claim 18, wherein in case said mobile phone is provided with a built-in backward transmission program corresponding to said portable mobile phone detector, then a backward transmission step is further included, such that said portable mobile phone detector utilizes said backward transmission program to transmit back telephone related data and personal data of said mobile phone to said portable mobile phone detector.

28. The mobile phone search method as claimed in claim 27, wherein said telephone related data includes:
power data, GPS related data, blue-tooth data, battery data, camera data, General Packet Radio Service (GPRS) data, motion sensor data, FM broadcast data, loudspeaker data, and WiFi related data.

29. The mobile phone search method as claimed in claim 27, wherein said personal data includes: name, blood type, and telephone number.

30. The mobile phone search method as claimed in claim 27, wherein
in said backward transmission step,
said portable mobile phone detector utilizes said backward transmission program to transmit back telephone related data and personal data of said mobile phone to said portable mobile phone detector, and it further utilizes said backward transmission program to ring said mobile phone or control screen of said mobile phone to blink.

* * * * *

UNITED STATES PATENT AND TRADEMARK OFFICE
CERTIFICATE OF CORRECTION

| | | |
|---|---|---|
| PATENT NO. | : 8,718,597 B2 | Page 1 of 1 |
| APPLICATION NO. | : 13/524661 | |
| DATED | : May 6, 2014 | |
| INVENTOR(S) | : Chiao-Yen Tai et al. | |

It is certified that error appears in the above-identified patent and that said Letters Patent is hereby corrected as shown below:

On the Title Page

Please change Item (73) Assignee from "MOBITEK COMMUNICATION CORP., Taipei (TW) and MediaTek Singapore Pte. Ltd., Solaris (SG)" to --Apex Step International Limited, Apia (WS)--.

Signed and Sealed this
Seventeenth Day of June, 2014

Michelle K. Lee
*Deputy Director of the United States Patent and Trademark Office*